Figure 5:
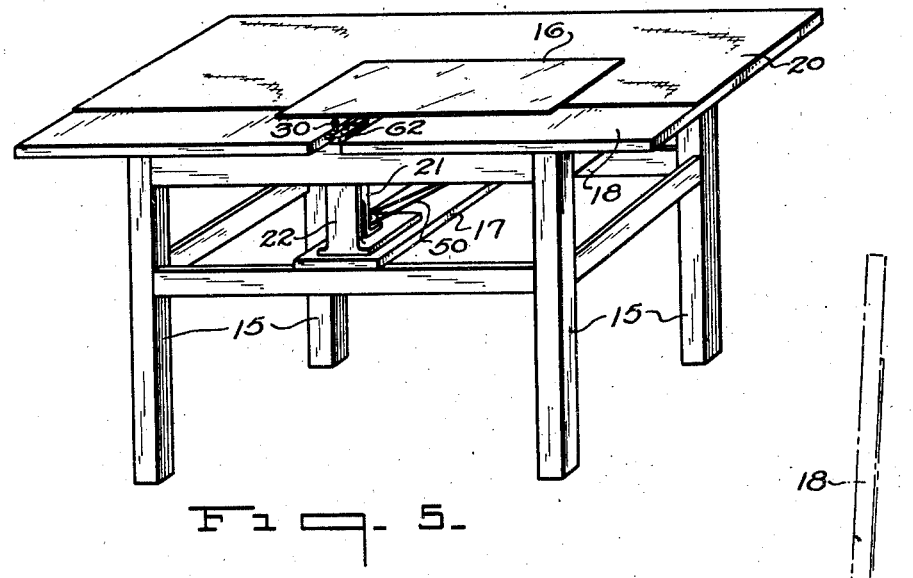

Feb. 27, 1934. W. G. HULLHORST 1,948,581
APPARATUS FOR GROOVING LAMINATED GLASS
Filed Sept. 10, 1928 4 Sheets-Sheet 1
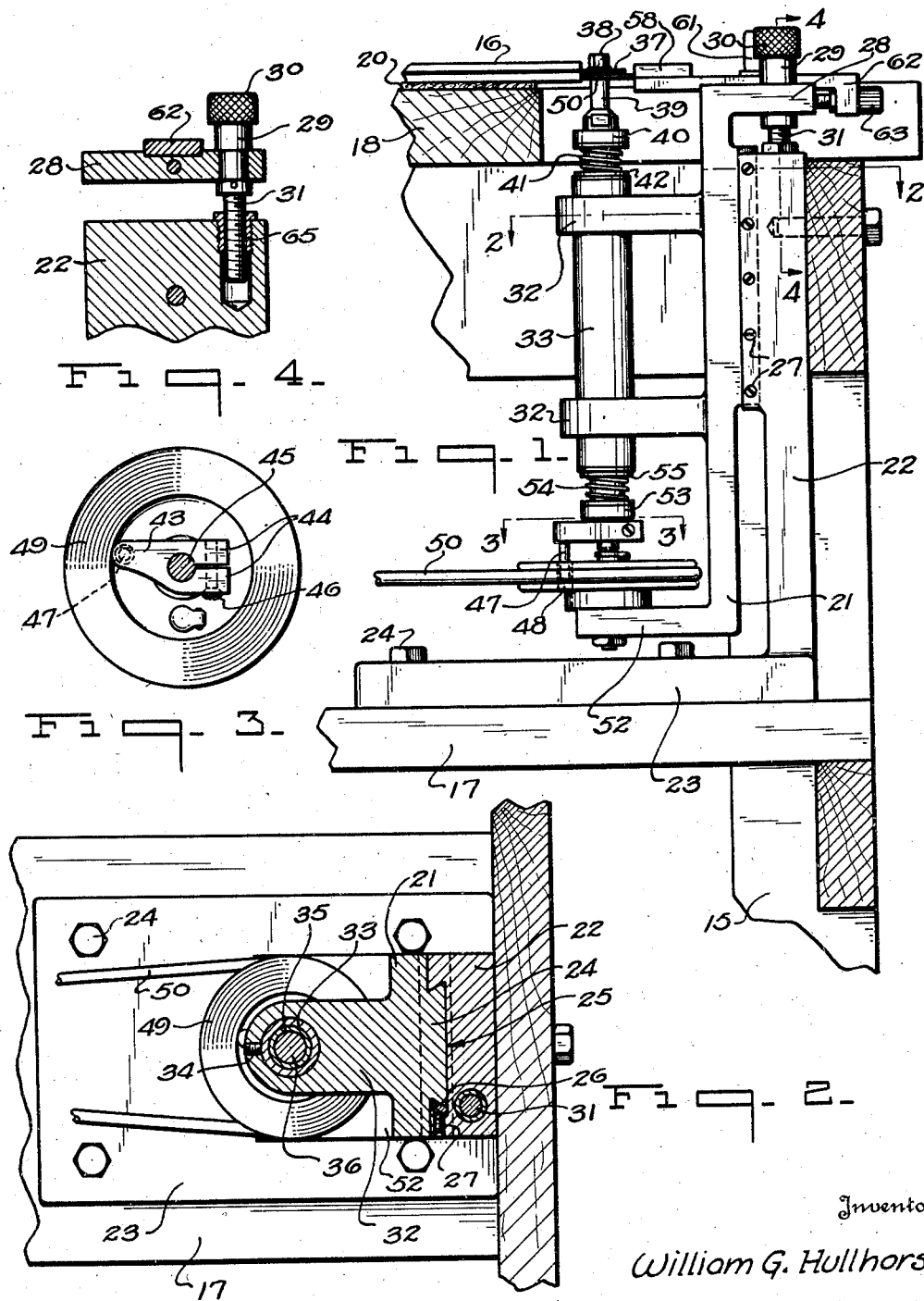
Inventor
William G. Hullhorst.
By Frank Fraser
Attorney Feb. 27, 1934.       W. G. HULLHORST       1,948,581
APPARATUS FOR GROOVING LAMINATED GLASS
Filed Sept. 10, 1928       4 Sheets-Sheet 2

Inventor
William G. Hullhorst.
By Frank Fraser
Attorney

Feb. 27, 1934.  W. G. HULLHORST  1,948,581
APPARATUS FOR GROOVING LAMINATED GLASS
Filed Sept. 10, 1928   4 Sheets-Sheet 3

Inventor
William G. Hullhorst.
By Frank Fraser,
Attorney

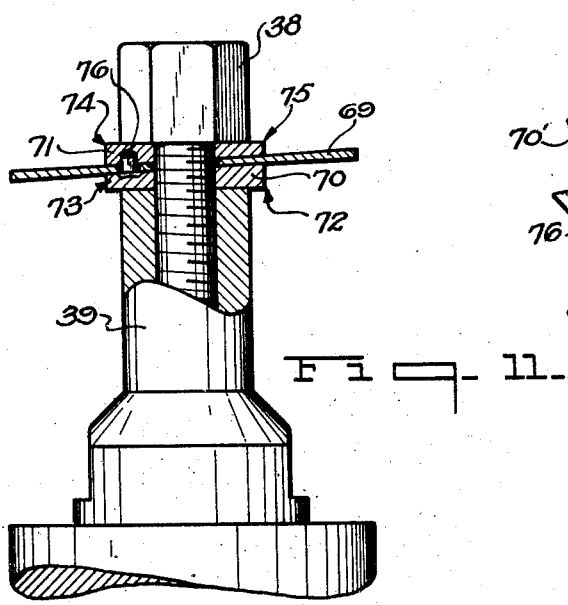
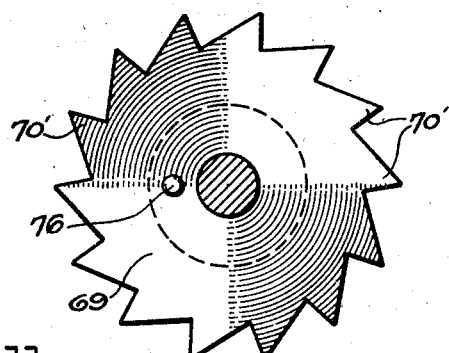
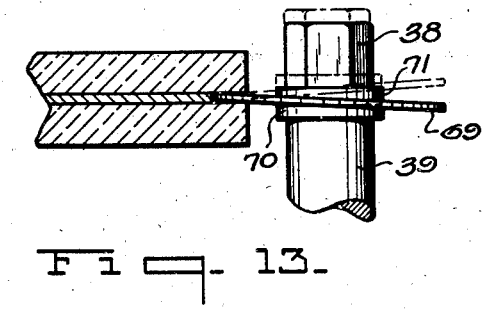
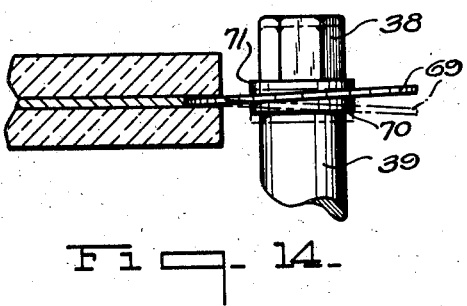
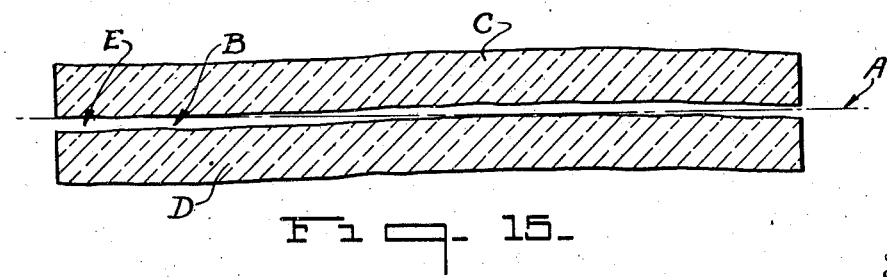

Patented Feb. 27, 1934

1,948,581

UNITED STATES PATENT OFFICE 1,948,581

APPARATUS FOR GROOVING LAMINATED GLASS

William G. Hullhorst, Toledo, Ohio; Stella B. Hullhorst, executrix of said William G. Hullhorst, deceased, assignor, by mesne assignments, to Libbey-Owens-Ford Glass Company, Toledo, Ohio Application September 10, 1928
Serial No. 305,072

9 Claims. (Cl. 90—11)

The present invention relates to apparatus for grooving or undercutting laminated glass to prepare the same for sealing.

An important object of the invention is to provide an improved apparatus for grooving or undercutting laminated glass wherein, after the laminations comprising the sheet of laminated glass have been bonded together, a predetermined amount of the non-brittle or inner lamination is removed to permit the insertion of a sealing material designed to protect the bond between the laminations whereby to prevent a separation thereof.

Laminated glass ordinarily comprises two or more sheets of glass and one or more sheets of non-brittle material such as for instance a cellulose composition material. There are numerous manners in which the laminations can be joined together, and suffice it is to say that various forms of cement or the like are ordinarily used for this purpose. The quality of the laminated sheet, however, is dependent upon and determined by the character of the bond therebetween. For a sheet of laminated glass to be satisfactory, it must be able to withstand heat and cold, vibration, etc. One of the difficulties encountered is that of "let-goes", which is a term used to designate a separation in the laminations, and obviously if the laminations become separated or parted, the utility of the laminated sheet is greatly diminished. "Let-goes" ordinarily, although of course not always, begin at the border portions of the sheet and work inwardly due to the action of the atmosphere, etc. upon the bond. To prevent this separation of the laminations, it is therefore important, or at least desirable, to seal the laminated sheet. Sealing of laminated glass is somewhat difficult due to the necessity of removing a portion of the non-brittle membrane to allow the insertion of the sealing material. That is, the laminated sheet must be grooved or undercut a sufficient depth to allow the insertion of a suitable material capable of withstanding the action of the elements. As far as I know, it has been customary in the past to groove laminated glass by means of hand tools. I am aware that attempts have been made to groove such glass with machinery, but these attempts have not been successful due to the excessive amount of breakage.

There are numerous difficulties encountered when endeavoring to undercut laminated glass by machinery. For instance, the space between the glass sheets of the laminated product is seldom absolutely uniform, because of slight inequalities in the thickness of the laminations used. Although this difference in thickness may vary but a few thousandths of an inch, nevertheless it is sufficient to create a real problem. Further, the finished laminated glass may be slightly bowed so that a straight line drawn through the space between the glass sheets will not be equi-distant from said sheets of glass throughout.

The present invention has therefore been designed to permit mechanical removal of the non-brittle sheet a sufficient depth from the edges thereof whereby to form a groove or channel adapted for the reception of the sealing material. My device is of such character that it can be adjusted to allow the removal of a definite and predetermined amount of material, or in other words, the depth of the groove can be accurately controlled. Furthermore, the device is capable of grooving such glass even though it is not absolutely flat and of uniform thickness.

Other objects and advantages of the invention will become more apparent during the course of the following description when taken in connection with the accompanying drawings.

Figure 6:
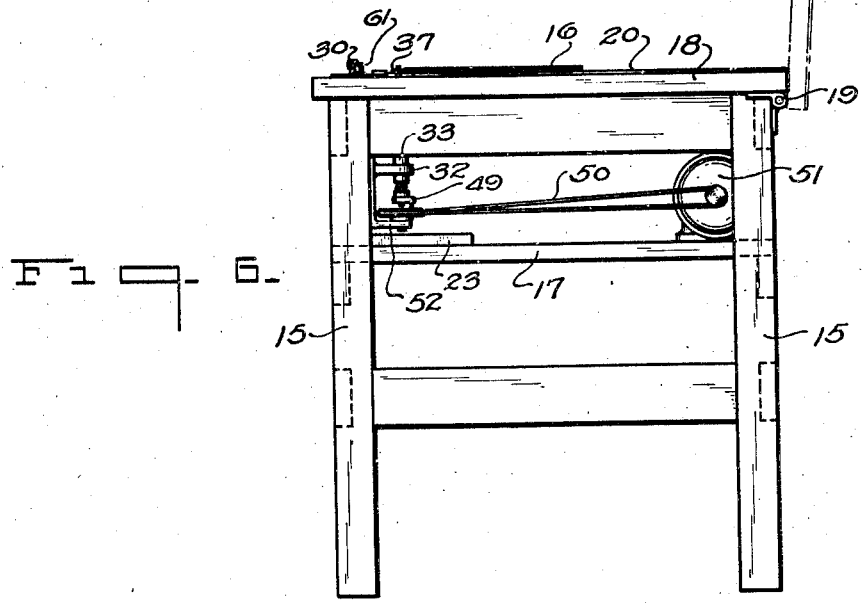
Figure 7:
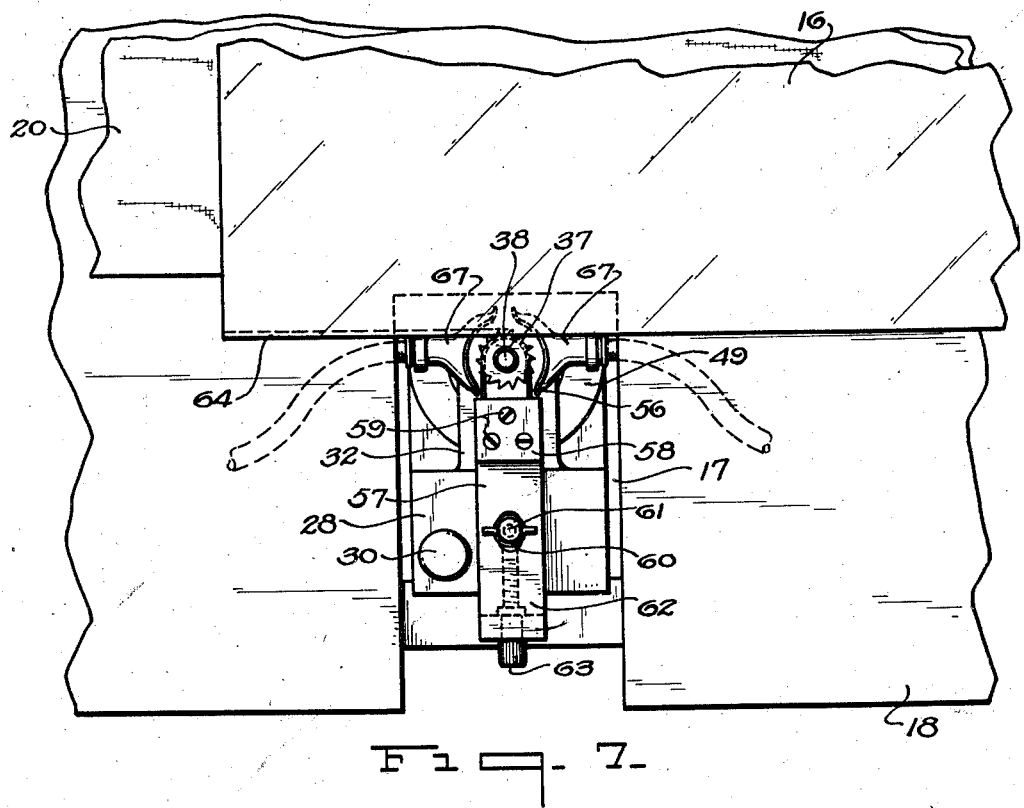
Figure 8:
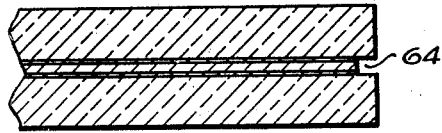
Figure 9:
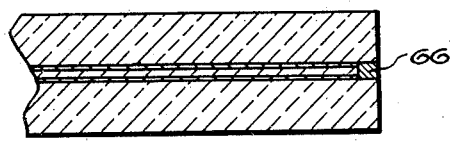
Figure 10:
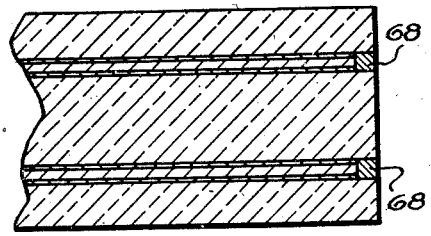

In the drawings wherein like numerals are employed to designate like parts throughout the same, Fig. 1 is an elevation of the machine illustrating the grooving of a sheet of laminated glass, Fig. 2 is a horizontal transverse sectional view taken on line 2—2 in Fig. 1, Fig. 3 is a section taken on line 3—3 in Fig. 1, Fig. 4 is a sectional detail taken on line 4—4 in Fig. 1, Fig. 5 is a perspective view of a table illustrating the machine in operative position, Fig. 6 is an end elevation thereof, Fig. 7 is a fragmentary enlarged plan view, Fig. 8 is a fragmentary sectional view of a sheet of laminated glass after it has been grooved, Fig. 9 is a similar section showing the sheet of Fig. 8 after the sealing material has been inserted in the groove, Fig. 10 is a similar section of a slightly modified type of commercial product, Fig. 11 is an enlarged elevation, partially in section, showing in detail the mounting of the working tool, Fig. 12 is a plan view thereof, Fig. 13 is a detail view showing the working tool in one position, Fig. 14 is a similar view showing the tool in another position, and Fig. 15 is a sectional diagrammatic view of a sheet of laminated glass.

Referring to the drawings and particularly to Figs. 5 and 6, the numeral 15 designates a table of sufficient size and strength to support my improved construction and the sheet of laminated glass 16 to be worked upon. The machine may be mounted on the support 17 arranged under the top 18 of the table. The top 18 is preferably pivotally mounted by means of the hinges 19 so that the top may be moved into an inoperative position as illustrated in dotted lines in Fig. 6 to permit the inspection, adjustment, or removal of the apparatus. To prevent scratching of the glass sheet 16, it is preferred that the top of the table be at least protected in part by felt or the like 20.

Referring more particularly to the construction of my machine, in Fig. 1 is illustrated a bracket support 21. The support 21 is adjustably associated with the slide 22 which is provided with the angular extension 23 serving as a foot which is bolted by means of bolts or the like 24 to the member 17. As shown more in detail in Fig. 2, the bracket 21 is provided with a tongue 24 receivable in the groove 25 of the member 22. To secure a rigid mounting and to compensate for wear in the groove or of the tongue, an adjustable slide plate 26, held in position by means of an adjustable screw 27, is provided. This construction is shown in detail in Fig. 2.

The bracket support 21 is provided with the angular extension 28, shown in Fig. 1, through which operates a threaded shaft 29 provided with the knurled operating portion 30. The shaft 29 is provided with the reduced threaded end 31, which threaded end is received in a threaded portion contained in the support 22, and by rotation of the knurled end 30 the bracket support 21 may be raised or lowered vertically as desired. The tongue and groove portions of the supports 21 and 22 respectively are of sufficient length to give rigidity to the machine.

Extending laterally from the bracket support 21 is a plurality of spaced arms 32 through which extends a sleeve member 33 held against accidental displacement by means of set screws 34 shown in Fig. 2. The sleeve member 33 is provided with sleeve bearings 35 through which is journaled a vertically disposed shaft 36 of greater length than the sleeve member. The shaft 36 carries at its upper end the working tool or grooving tool 37 detachably held in position by means of a threaded screw 38 receivable in the reduced end 39. Also carried by the upper end of the shaft is a removable ring member 40 under which is arranged a spring 41 encircling the shaft. The spring 41 is interposed between the ring member 40 and a washer 42 supported upon the upper end of the sleeve member. The size and strength of the spring 41 is such that it will readily support the shaft 36 and parts carried thereby.

Associated with the lower end of the shaft is a driving mechanism, and as shown more clearly in Fig. 3, an arm 43, having the bifurcated ends 44, is clamped upon the reduced end 45 of the shaft 36. A screw 46, operable through the bifurcated ends 44, is used to properly clamp the arm 43 in position. A crank pin 47 is carried by the arm 43 and depends therefrom, being receivable in a relatively large opening 48 formed in the pulley 49. The pulley 49 has trained thereabout a belt 50 deriving power from the motor 51 shown in Fig. 6. The pulley is rotatable about a shaft carried by the angular extension 52 which is also carried by the bracket support 21.

Mounted above the arm 43 is a detachable ring 53, spring 54 and washer 55, the ring 53 being designed to prevent accidental displacement of the spring 54. It will be seen that the shaft and thus the grooving tool 37 is free to float vertically within the sleeve member 33. The size of the upper spring 41 is such that it will support the shaft and other parts carried thereby and yet it is of sufficient resiliency to permit free floating of the shaft. As the lower spring 54 does not carry any weight, its size is relatively less than that of the other spring. However, the springs are balanced so that the grooving tool will readily adapt itself to the sheet of laminated glass being worked upon.

However, I do not consider my invention to be limited to a vertical type machine, because if desired the parts can be arranged horizontally or in an inclined plane.

As above stated, the laminated sheet to be grooved comprises two or more sheets of glass and a sheet or more of non-brittle material. In some instances, ordinary window glass is used in the production of the laminated product, while in other cases plate glass is used. Oftentimes, the laminated sheet is not absolutely flat and if the grooving tool is not free to accommodate itself to the contour of the laminated sheet, such sheet will be broken. With the type of shaft and tool illustrated, however, the grooving tool will readily adapt itself to the contour of the laminated product and consequently no breakage will occur. The sheet of laminated glass being worked upon is designated by the numeral 16. The depth of the groove formed is also of importance and particularly that the depth be constant. To accomplish this end, a guide member in the nature of a wire 56 is used. Referring to Fig. 7, it will be seen that the guide member 56 is adjustably carried by the arm 57 and is clamped by the plate 58 upon the arm 57 by means of bolts 59. The arm 57 is provided with an elongated opening 60 through which extends a clamping screw 61. The end of the arm 57 terminates in a downwardly extending flange 62 through which operates a threaded shaft 63 bearing against the extension 28 of the bracket 21. By adjusting the threaded shaft 63 when the clamping screw 61 is loose, the arm 57 and guide member 56 may be moved horizontally. The depth of the groove is therefore controlled by proper adjustment of the threaded shaft 63. After the proper adjustment has been made, the clamping screw 61 is tightened, thus preventing accidental displacement of the guide member. The guide member is preferably arranged beneath the cutting tool, and it will be noted that the edge of the laminated sheet slides along in contact with the guide member, and by reason of rotation of the cutting tool, the channel or groove 64 will be formed in the laminated sheet. This channel is shown clearly in Figs. 7 and 8. The position of the cutting tool 37 is determined by the adjustment of the shaft 29, a detail of which is shown in Fig. 4. It will be seen that the threaded portion 31 operates in the threaded bushing 65, and by adjustment one way or the other the entire bracket 21 is moved vertically. It is not absolutely necessary that an accurate adjustment be had with the shaft 29 because the floating shaft will take care of any variations that may exist. It is, of course, desirable to set the shaft 29 approximately accurate so that the shaft and tool will be free to float in both directions vertically to take care of any variations that may exist in the laminated sheet being grooved or undercut. The speed of rotation of the tool is preferably controlled by means of a rheostat or the like associated with the drive.

To groove a laminated sheet, the machine is adjusted to take care of the thickness of sheet being operated upon. The sheet edge is then placed in contact with the guide member 56 and the sheet moved horizontally so that the cutting tool will remove the non-brittle or inner membrane. After the groove 64 has been formed, any suitable form of sealing material may be inserted therein to produce the seal 66 shown in Fig. 9. This sealing material may be suitable wax, pitch, or the like and can be applied in any desired manner, the present invention relating primarily to the means for grooving the laminated sheet.

In Fig. 7 is illustrated diagrammatically an exhaust means 67 which may be associated with a suitable suction means whereby to catch and convey away from the cutting tool the material removed from the laminated sheet. The position and arrangement of the exhaust means may be varied as desired. In Fig. 10 is shown the so-called "bullet-proof" type of glass, in which type two seals 68 are formed.

Figs. 11 to 14 show in detail the mounting of the working tool or saw on the floating shaft. The saw 69 is preferably hollow ground so that the teeth 70 are the thickest parts thereof. The saw is preferably made from a suitably heat treated metal of a nature to stand the heat generated during the undercutting of the laminated sheet, and also the size and number of teeth can be varied as desired. As above pointed out, the work tool or saw is held in position by means of the screw member 38 received in the end 39. As a matter of fact, the saw is clamped between the rings or discs 70 and 71 which are illustrated in an exaggerated manner. However, the rings are ground or otherwise formed so that one side of each ring is thicker than the other and thus the side 72 of ring 70 is relatively thicker than the side 73, and side 74 is thicker on the ring 71 than the side 75. In actual practice the difference in thickness between the two sides of a ring is a matter of several thousandths of an inch, although in the drawings the difference is greatly exaggerated for the sake of illustration.

The ring 70 is provided with a pin 76 extending through the saw and received within an opening in the other ring or disc 71. The location of the opening is such that when the rings and saw are placed in assembled position, the thickest part of one ring or disc will be opposite the thinnest part of the other ring. Thus, the longitudinal axis of the saw will not be exactly at right angles to the longitudinal axis of the shaft, but rather one edge of the saw will be slightly above and the other edge slightly below such axis. This produces, in effect, a wobbly saw when it is rotated.

In Fig. 15 is shown diagrammatically a sheet of laminated glass with a straight line A drawn therethrough. It will be noted that the sheet of laminated glass illustrated is not perfectly flat. Although this figure has been exaggerated slightly for purposes of clearness, nevertheless it represents actually a condition confronted with. It must be borne in mind that the slightest fraction of an inch deviation is enough to cause trouble, although such a slight difference if drawn to scale in the drawings would not be obvious. Secondly, attention is directed to the fact that the space at B between the sheets of glass C and D is less than the space at E. In fact, the space between the glass sheets will vary in actual practice entirely across the laminated product, and this is true whether plate glass is used or not. Of course, the difference is greater if unground and polished glass is used, and great quantities of such glass are employed in laminated glass manufacture. It will thus be seen that the maximum thickness of the saw must be less than the narrowest possible space between the glass sheets as otherwise the glass will be separated from the non-brittle lamination or the glass will be broken, and either condition is of course objectionable. Using such a saw, therefore, unless proper provisions are made, the glass will not be scraped clean in the channel. In this event, it is necessary to use a hand tool or some other medium to remove the rest of the material so that the glass sheets will be perfectly clean for the reception of the sealing material.

The present machine is designed in such a manner, however, that the glass sheets will be cleaned the entire depth of the channel because of the combination of the wobbly saw and the floating shaft. As shown clearly in Figs. 13 and 14, the saw does not go straight into the channel when cutting the same but rather goes in at an angle, and this is because the sheet is supported and movable upon a surface which is arranged at right angles to the longitudinal axis of the floating shaft while the saw is positioned in a plane slightly inclined thereto. Upon rotation, the shaft will float up and down and the wobbly saw will assume positions illustrated in these two figures. Attention is directed to the fact that the saw reciprocates from first one sheet of glass to the other, and due to its rapid speed each sheet of glass will be made clean. The thickness of the saw is less than the thinnest space between the glass sheets so that there will be no jamming, and yet due to the quivering action of the wobbly saw the laminated sheet will be properly undercut throughout the entire length of the channel. It will be noted that the movement of the wobbly saw, due to its inclined mounting is greater than the variations in thickness of the space between the glass sheets. Therefore, the saw will, because of its floating support, readily adapt itself to the contour of the laminated sheet being undercut and also make the glass sheets clean regardless of variations in the space between the glass sheets. With a saw sufficiently thin, it is almost impossible to break a sheet of glass while undercutting a sheet of laminated glass with my grooving machine.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for undercutting laminated glass consisting of two sheets of glass and an interposed non-brittle membrane, comprising a support for the sheet to be cut, a floating shaft, and a wobbly saw carried thereby and adapted to be received between the two glass sheets so that the laminated structure will be undercut upon relative movement between the tool and sheet.

2. An apparatus for undercutting laminated glass consisting of two sheets of glass and an interposed non-brittle membrane, comprising a support for the sheet to be cut, a floating shaft, a wobbly saw carried thereby and adapted to be received between the two glass sheets so that the laminated structure will be undercut upon relative movement between the tool and sheet, and means for controlling the depth of said cut.

3. An apparatus for undercutting laminated glass consisting of two sheets of glass and an interposed non-brittle membrane, comprising a support for the laminated sheet to be undercut, and a rotatable saw adapted to be received between the two glass sheets and arranged in a plane inclined to the longitudinal axis of said sheet of laminated glass but being supported on a member arranged at substantially right angles to the longitudinal axis of the laminated sheet so that upon rotation of the saw it will clean the inner surfaces of both sheets of glass of said laminated structure.

4. An apparatus for undercutting laminated glass consisting of two sheets of glass and an interposed non-brittle membrane, comprising a support upon which the sheet of laminated glass may be moved, a floating shaft arranged at substantially right angles to the longitudinal plane of the sheet, and an undercutting tool carried by the floating shaft and adapted to be received between the two glass sheets of the laminated structure, said tool being disposed in a plane inclined with respect to the longitudinal plane of said laminated structure.

5. An apparatus for undercutting laminated glass consisting of two sheets of glass and an interposed non-brittle membrane, comprising a support upon which the sheet of laminated glass may be moved, a floating shaft arranged at substantially right angles to the longitudinal plane of the sheet, an undercutting tool carried by the floating shaft and adapted to be received between the two glass sheets of the laminated structure, said tool being disposed in a plane inclined with respect to the longitudinal plane of said laminated structure, and a depth control member associated with said undercutting tool.

6. An apparatus for undercutting laminated glass consisting of two sheets of glass and an interposed non-brittle membrane, comprising a floating shaft, means for rotating the same a wobbly saw carried by the shaft and movable therewith, said saw being adapted to be received between the two sheets of glass of said laminated structure, and means arranged in proximity to the saw upon which a sheet of laminated glass may be supported and moved.

7. An apparatus for undercutting laminated glass consisting of two sheets of glass and an interposed non-brittle membrane, including a freely floating shaft and a wobbly saw carried thereby, said saw being adapted to be received between the two glass sheets of the laminated structure.

8. An apparatus for undercutting laminated glass consisting of two sheets of glass and an interposed non-brittle membrane, comprising a support, a sleeve member carried thereby, a floating shaft extending therethrough, a tool carried by one end of the shaft and inclined from the plane at right angles to the longitudinal axis of the shaft, and means upon which the laminated sheet may be moved in a manner that the tool will be received between the two sheets of glass of said laminated structure whereby to undercut said structure.

9. An apparatus for undercutting laminated glass consisting of two sheets of glass and an interposed non-brittle membrane, comprising a support, a sleeve member carried thereby, a floating shaft extending therethrough, a tool carried by one end of the shaft and inclined from the plane at right angles to the longitudinal axis of the shaft, means upon which the laminated sheet may be moved in a manner that the tool will be received between the two sheets of glass of said laminated structure whereby to undercut said structure, and means to limit the depth to which the structure is undercut.

WILLIAM G. HULLHORST.